(No Model.)

M. SCHNEIDER.
LUBRICATOR.

No. 381,586. Patented Apr. 24, 1888.

Witnesses:
Paul Fischer.
Joseph Purathy

Inventor:
Max Schneider.
by
Att'ies.

UNITED STATES PATENT OFFICE.

MAX SCHNEIDER, OF DOOS, NEAR NUREMBERG, BAVARIA, GERMANY.

LUBRICATOR.

SPECIFICATION forming part of Letters Patent No. 381,586, dated April 24, 1888.

Application filed February 15, 1888. Serial No. 264,102. (No model.) Patented in Belgium March 31, 1885, No. 68,201; in England April 9, 1885, No. 4,263; in Austria-Hungary July 18, 1885, No. 12,042 and No. 37,935, and in France July 31, 1885, No. 167,675.

*To all whom it may concern:*

Be it known that I, MAX SCHNEIDER, residing at Doos, near Nuremberg, in the Kingdom of Bavaria, Germany, have invented a new and useful Improvement in Lubricators, of which the following is a specification, reference being had therein to the accompanying drawings, (no patents being obtained by me anywhere for this invention, save in France, No. 167,675, dated July 31, 1885; Belgium, No. 68,201, dated March 31, 1885; Austria-Hungary, No. 12,042 and No. 37,935, dated July 18, 1885; Great Britain, No. 4,263, dated April 9, 1885.)

The object of my invention is to provide a lubricator with a screw-actuated compressing cap or vessel, whereby the lubricating-grease may be forced from the discharge-opening of the lubricator, and to provide means for so effectually packing said screw compression cap or vessel to the body of the lubricator that leakage of the grease is prevented and all danger of the screw-cap working loose on the body of the lubricator is obviated.

Figure 1:
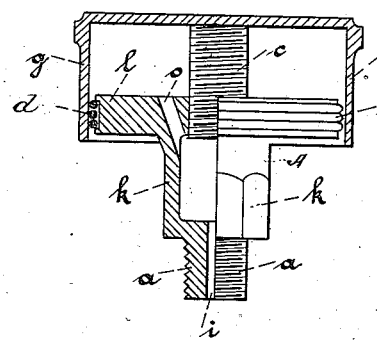
Figure 2:
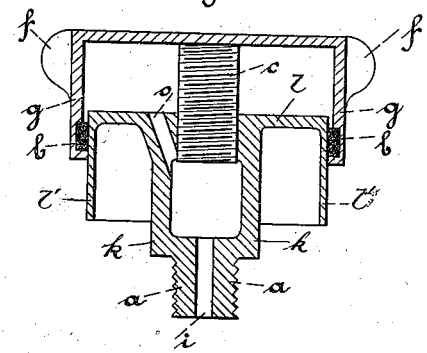
Figure 3:
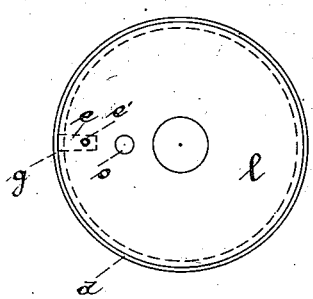
Figure 4:
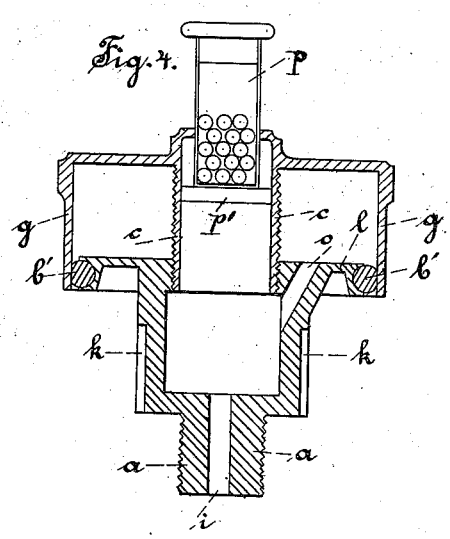

In the accompanying drawings, Figure 1 is partly a vertical section and partly a side elevation of a lubricator embodying my improvements. Fig. 2 is a sectional view of a modified form of my lubricator. Fig. 3 is a top plan view of the body of my lubricator, the cap being removed. Fig. 4 is a vertical sectional view of another modified form of my lubricator.

A represents the body or base of the lubricator, which comprises the circular plate or disk $l$, the stem $k$ depending from the center thereof, and the screw-threaded extension $a$ on the lower end of the stem, adapted to engage a threaded opening in the bearing or other part of a machine (not shown) to be lubricated, so as to secure the lubricator firmly to said bearing or part. The stem $k$ is hollow, and the bore thereof communicates at the lower end with a bore or discharge-opening, $i$, in the extension $a$.

$o$ represents an inclined opening which extends from the upper end of the bore at one side thereof to the upper face of the disk or plate $l$, and in the center of said disk or plate is a screw-threaded opening which communicates with the upper end of the bore of the stem. In the periphery of the plate or disk is made a groove or channel, as shown in Fig. 1, in which is placed a packing-cord, $d$, the said cord being wound around the plate or disk and having its ends secured firmly in a radial opening, $e$, by means of a pin or key, $e'$, as shown in Fig. 3.

$g$ represents an inverted cap or cup which forms the cover for the lubricator and the reservoir for the lubricating-grease. The sides of the said cap or cup fit around the disk or plate $l$ and tightly compress the packing-cord, so that the latter effects a perfectly-tight joint between the cup or cap and the disk or plate, and also exerts so much frictional resistance to the rotation of the cup or cap that the latter is prevented from working loose and becoming displaced by the jarring of the machine to which the lubricator is applied. From the center of the top of the cap or cup and rigid with or formed integral with the same depends a screw-stem, $c$, which engages the threaded central opening in the disk or plate, and is thereby adapted to raise or lower the cup on the disk when the former is turned, as will be readily understood.

The lubricator being filled with grease and the cup being turned, so as to cause it to be forced downward by the screw, the grease is forced through the opening $o$, the bore of the stem $k$, and the opening $i$ onto the bearing or part of the machine to which the lubricator is applied and thereby lubricates the same.

In Fig. 2 I show a modified form of my invention, in which the periphery of the plate $l$ is plain and is extended downward to form a depending flange, $l'$, and in which an annular groove or recess is made in the inner side of the depending portion of the cup and receives and retains a packing-ring, $b$. In this form of my invention I also provide the cup with radial projecting wings $f$ near its upper side, by means of which the said cup may be more conveniently grasped and rotated, so as to force out the lubricant.

In Fig. 4 I illustrate another modified form of my invention, which is adapted to be used on crank stuffing-boxes of engines and other moving parts of machinery which are in constant motion, and thereby render it very hazardous and almost impossible to grasp and operate the cup of the lubricator. In this form of my invention the periphery of the plate *l* is provided with a groove or channel that receives and retains the packing-ring *d'*, and I make the screw-stem *c* of the cup hollow, so as to communicate at its lower end with the bore of the stem *k* and fit a piston, P', in the bore of said screw-stem *c*. The operating-rod P of said piston is hollow and is filled to any desired extent with weights sufficient to cause the piston to exert the required downward pressure. The operation of this form of my invention is as follows: When the cup is screwed downward, the lubricating-grease is forced into and fills the bore of the stem *k*, and is also forced up in the bore of screw-stem *c* and caused to raise the weighted piston. As the grease becomes gradually consumed by the friction of the parts of the machine as it is applied thereto through the opening *i*, the weighted piston descends slowly by its own gravity on the lubricating-grease in the hollow stems *c* and *k*, and consequently forces the grease continuously through the opening *i* as fast as it is consumed. By weighting the piston to the necessary extent, according to the density and condition of the grease and the amount thereof consumed by the machine or engine in a given time, the lubricator may be so adjusted as to cause the grease to be fed to the machine automatically as fast as the lubricant is needed.

Having thus described my invention, I claim—

1. In a lubricator, the combination of the body A, having the circular plate *l*, the hollow stem and an opening, the cup or receptacle *g*, having the screw-stem *c*, engaging a threaded opening in the plate, and the packing between the said plate and the said cup or receptacle.

2. In a lubricator, the combination of the body A, having the circular plate *l*, the hollow stem *k*, and the opening *o*, communicating with the bore of said stem, with the cup or receptacle fitting snugly on the plate, and having the screw-stem *c*, engaging a threaded opening in the plate, for the purpose set forth.

3. The combination of the body A, having the circular plate *l*, the depending hollow stem *k*, and opening *o*, with the cup or receptacle *g*, fitting snugly on the plate A, and having the hollow screw-stem *c*, engaging a threaded opening in the plate and communicating with the bore of the hollow stem, and the weighted piston arranged in the bore of the screw-stem *c*, all arranged and adapted to operate substantially as described.

In witness whereof I have hereunto set my hand in presence of two witnesses.

MAX SCHNEIDER.

Witnesses:
   ADOLF SELLHEIMER,
   BERTHOLD KITZINGER.